United States Patent
Weaber et al.

(10) Patent No.: US 6,309,689 B1
(45) Date of Patent: Oct. 30, 2001

(54) METHOD TO PROCESS CHOCOLATE PRECURSOR PARTICLES INTO SOLID BLOCKS

(75) Inventors: Kenneth Weaber, Lancaster, PA (US); William De Santi, Morris Plains, NJ (US); Hugh Mahoney, Stroudsburg, PA (US)

(73) Assignee: Hawley & Hoops, Inc., McLean, VA (US)

( * ) Notice: Subject to any disclaimer, the term of this patent is extended or adjusted under 35 U.S.C. 154(b) by 0 days.

(21) Appl. No.: 09/291,002

(22) Filed: Apr. 14, 1999

(51) Int. Cl.[7] ...................................... A23G 1/00
(52) U.S. Cl. .................. 426/588; 426/584; 426/631; 426/454
(58) Field of Search ................... 426/584, 588, 426/631, 660, 454

(56) References Cited

U.S. PATENT DOCUMENTS

| | | | |
|---|---|---|---|
| 2,400,292 | * 5/1946 | Dalton | 426/454 |
| 2,661,295 | * 12/1953 | Francis | 426/454 |
| 2,839,407 | * 6/1958 | Brochner | 426/454 |
| 2,850,388 | * 9/1958 | Peebles | 426/584 |
| 3,013,881 | * 12/1961 | Carlson | 426/584 |
| 3,098,746 | * 7/1963 | Noznick | 426/660 |
| 3,622,342 | * 11/1971 | Rusoff | 426/658 |
| 3,702,252 | * 11/1972 | Veltman | 426/658 |
| 4,084,011 | 4/1978 | Chevalley et al. | 426/580 |
| 4,394,395 | * 7/1983 | Rostagno | 426/454 |
| 4,519,304 | 5/1985 | Ripani | 99/489 |
| 4,688,177 | 8/1987 | Ripani et al. | 364/468 |
| 4,759,940 | * 7/1988 | Cattaneo | 426/454 |
| 5,080,923 | * 1/1992 | Martin | 426/607 |
| 5,181,456 | 1/1993 | Theys et al. | 99/485 |
| 5,419,635 | 5/1995 | Shulte et al. | 366/85 |
| 5,591,476 | 1/1997 | Capodieci | 426/631 |
| 5,626,900 | * 5/1997 | Miller | 426/631 |
| 5,962,063 | * 10/1999 | Siukola | 426/631 |

FOREIGN PATENT DOCUMENTS

0248462 * 5/1987 (EP) ..................... 426/631

* cited by examiner

*Primary Examiner*—Carolyn Paden
(74) *Attorney, Agent, or Firm*—Fitzpatrick, Cella, Harper & Scinto

(57) ABSTRACT

Solid blocks of crumb precursor are formed by compressing masses of crumb precursor particles. The crumb precursor particles contain milk powder, crystalline sugar, and optionally chocolate liquor.

17 Claims, No Drawings

METHOD TO PROCESS CHOCOLATE PRECURSOR PARTICLES INTO SOLID BLOCKS

BACKGROUND OF THE INVENTION

1. Field of the Invention

This invention relates to a method to process chocolate precursor particles into solid blocks. In particular, this invention relates to a method to form solid blocks from a mass of free-flowing particles composed of dry concentrated milk, granulated crystalline sugar, and cocoa liquor by subjecting the particle mass to compressive pressure. This invention also relates to the solid block formed by the method of this invention.

2. Related Background

Early in the process of making milk chocolate, particles ("the crumb precursor") composed of granulated crystalline sugar, dry milk, and chocolate liquor are mixed with water to form an aqueous dispersion/solution. The aqueous dispersion/solution is then vacuum dried to form the milk crumb. These steps of (i) mixing of the milk crumb precursor with water followed by (ii) vacuum drying are essential to the formation of the milk crumb in order to transform the sugar from the crystalline form to the amorphous form required for milk crumb.

The milk crumb precursor, being in free-flowing particulate form, presents transporting and handling problems inherent to free-flowing particle masses. Specialized transport carriers and transfer equipment are required to handle such fluid masses of particles. Further, problems associated with the formation of dust and static electricity, particularly with regard to health and safety, are a concern.

It would be desirable to be able to transport the milk crumb precursor in a solid block form. Discrete solid blocks allow easy transportation and handling. By compressing the crumb precursor into discrete solid blocks, the tendency of the free-flowing material to "clump up" during storage is avoided. Such randomly aggregated material causes problems in equipment designed to handle a free-flowing material.

Furthermore, solid blocks are substantially free of dust. An additional benefit is derived from the reduced surface area of the solid block compared to the particulates. The reduced surface area provides a longer shelf-life from that of the particulates.

The compressive force used to form a solid block also can increase the density of the milk crumb precursor. Thus, the volume required to transport a given weight of crumb precursor is reduced. This can lead to benefits in shipping and packaging of the material.

U.S. Pat. No. 4,084,011 describes a process of taking crumb containing sugar that is substantially amorphous and subjecting the crumb to compression in order to induce rapid crystallization of the amorphous sugar. The crumb is spread in thin layers and crushed between the plates of a press to form tablets or small cylindrical granules.

U.S. Pat. No. 5,419,635 describes a machine for treating chocolate masses and a method for producing crumb. U.S. Pat. No. 5,591,476 describes a process and a system to produce conched chocolate.

U.S. Pat. Nos. 4,519,304 and 4,688,177 describe devices for handling chocolate that includes feeding chocolate masses between rollers.

U.S. Pat. No. 5,181,456 describes an apparatus and a method for forming a food mass from food pieces, without a binder, by subjecting the food pieces to compression and lowered temperature.

SUMMARY OF THE INVENTION

The present invention subjects a free-flowing mass composed of a multitude of particles comprising milk powder, sugar in substantially crystalline form and optionally, but preferably, chocolate liquor to compressive pressure to form a solid mass block.

The invention forms a solid block of crumb precursor by compressing a confined mass of free-flowing crumb precursor particles at a pressure effective to form a substantially contiguous mass, wherein the crumb precursor includes sugar in substantially crystalline form and milk powder.

DETAILED DESCRIPTION OF THE INVENTION

In this invention, a free-flowing mixture of particles composed of milk powder, granulated crystalline sugar, and chocolate liquor is subjected to compressive pressure to form a solid block. The solid block can be characterized as a substantially contiguous mass. The individual particles can be neat and/or mixtures of milk powder, sugar and chocolate liquors.

Percentages are by weight unless otherwise specifically defined.

The crumb precursor particles can be any convenient size. Typically, the particles have an average particle size from about 20 $\mu$m in diameter to about 2000 $\mu$m in diameter.

As described above, the density of the crumb precursor mass can change as a result of the compressive force. For example, the bulk density of the crumb precursor particles is typically in the range of from about 0.7 g/cc to about 0.9 g/cc. After compression, the bulk density can increase to from about 1.4 g/cc to about 1.5 g/cc in the solid block.

The crumb precursor mixture can include from about 20 wt % to about 38 wt % milk powder, from about 40 wt % to about 70 wt % sugar and optionally, but preferably, about 8 wt % to about 20 wt % chocolate liquor. The milk powder can contain fat levels from less than about 0.5 wt % (skim milk powder) to about 75 wt % (for dried cream). An example contains 40 wt % fat (for high fat whole milk powder). The sugar can be any convenient sugar such as, for example, sucrose, brown sugar, refined sugar, fructose, maltose, glucose, lactose, or any combination, that is substantially crystalline. By substantially crystalline, it is meant that at least 50% by weight is in a crystalline phase, preferably, more than 70 wt %, and most preferably more than 80 wt % crystalline. In certain circumstances, it might be desirable to add the chocolate liquor later to the chocolate crumb, but typically it is conveniently included in the crumb precursor mixture.

The crumb precursor mixture can conveniently include other nutritive carbohydrate sweeteners, flavorings such as, for example, nutmeats, coffee, spice, salt, or malted cereal extract, and other forms of dairy ingredients and emulsifiers. Other nutritive carbohydrate sweeteners that can be added at lessor amounts in addition to the crystalline sugar component include, for example, sucrose, lactose, glucose, corn syrup solids, maltose, and fructose. Other forms of dairy ingredients include, for example, skim milk, whole milk, buttermilk solids, milkfat, butter, and cream. Emulsifiers include, for example, lecithin derived from vegetable sources such as soybean, safflower, corn, etc., fractionated lecithins enriched in either phosphatidyl choline, or phosphatidyl ethanolamine, or phosphatidyl inositol or any combination thereof, mono-phosphate derivatives of mono- and di- glycerides/diacetyl tartaric acid esters of mono- and di-glycerides (also referred to as PMD/DATEM), monosodium phosphate derivatives of mono- and di- glycerides of edible fats or oils, sorbitan monostearate, polyoxyethylene sorbitan monostearate, hydroxylated lecithin, lactylated fatty acid esters of glycerol and propylene glycol, polyglycerol esters of fatty acids, sucrose esters, propylene glycol mono- and diesters of fats and fatty acids, and the like.

The compressive pressure should be above about 2400 psi (169 kg/cm$^2$). It is advantageous for the compressive pressure to be from about 3,000 psi (211 kg/cm$^2$) to about 7,000 psi (492 kg/cm$^2$).

A small amount of moisture can be added to the crumb precursor mixture prior to subjecting the particulate mixture to compressive pressure. Up to about 6 wt % water can be added, preferably up to about 4 wt %, more preferably up to about 2 wt %, to the crumb precursor particles.

When water is included in the crumb precursor mixture, the compressive pressure needed to form discrete solid blocks can be lower than the compressive pressure needed to form blocks from comparable crumb precursor mixtures without added moisture. With the presence of moisture, the compressive pressure should be above about 2000 psi (141 kg/cm$^2$). It is advantageous for the compressive pressure to be from about 2000 psi (141 kg/cm$^2$) to about 5000 psi (352 kg/cm$^2$) when water in the amount of from about 1 wt % to about 4 wt % is included in the crumb precursor mixture.

The solid block formed by the method of this invention may take any form, but typically it is rhombic, orthorhombic, cylindrical or cubic in shape. The blocks may be formed with any convenient device capable of applying the desired pressure to the crumb precursor mixture within a defined space. Such devices are readily available to those skilled in the art. The solid blocks formed by the method of this invention will generally have a volume greater than about 25 cm$^3$, more preferably greater than 1000 cm$^3$ and most preferably greater than 5000 cm$^3$.

The compressive pressure can be applied at any convenient temperature as would be apparent to one skilled in the art. Temperatures from about room temperature to about 120° F. (50° C.) can be used without detrimental effect on the formed blocks. The compressive pressure should be applied for an effective duration of time readily determined by one skilled in the art. Preferably, the crumb precursor particles are subjected to compressive pressure for at least 12 seconds.

However, smaller quantities of crumb precursor can be conveniently subjected to compressive pressure for shorter periods of time, readily determined by one skilled in the art. For example, 5 g quantities of crumb precursor were pressed for approximately one second to produce small tablet size solid blocks according to this invention using a briqueting machine available from K.R. Komarek Co., Elk Grove Village, Ill.

The examples which follow are intended only as an illustration of certain preferred embodiments of the invention and no limitation of the inventions is implied.

EXAMPLE 1

A crumb precursor mixture (53 lbs. or 19.78 kg.) comprising about 32 wt % whole milk powder, 60 wt % granulated crystalline sugar, and 8 wt % chocolate liquor was subjected to 6500 psi (457 kg/cm$^2$) pressure for 15 seconds to form a solid block having a dimension of about 25 cm×25 cm×30 cm (10 in.×10 in.×12 in.).

EXAMPLE 2

A crumb precursor particle mixture (12 lbs. or 5.45 kg) essentially the same as in Example 1 was subjected to 4500 psi (316 kg/cm$^2$) for 40 seconds to form a solid cylindrical block 15.24 cm (6 in.) in diameter and 20.96 cm (8.25 in.) in height.

EXAMPLE 3

About 2 wt % moisture was added to the crumb precursor particle mixture described in Example 2 prior to compression. Blocks were formed from this mixture using lower pressure than for comparable blocks without added moisture. In this case, the 2% water-added mixture was subjected to 3600 psi (253 kg/cm$^2$) for 20 seconds to form a solid cylindrical block 15.24 cm (6 in.) in diameter and 20.96 cm (8.25 in.) in height.

Other variations and modifications of this invention will be apparent to those skilled in this art after careful study of this application. This invention is not to be limited except as set forth in the following claims.

What is claimed is:

1. A method to form a solid block of crumb precursor comprising compressing a confined mass of free-flowing crumb precursor particles at a pressure effective to form a substantially solid block, wherein said crumb precursor includes about 20 wt % to about 38 wt % milk powder, about 8 wt % to about 20 wt % chocolate liquor and about 40 wt % to about 70 wt % sugar in substantially crystalline form prior to and after compressing.

2. The method according to claim 1, wherein said pressure is greater than about 3000 psi.

3. The method according to claim 1, wherein said pressure is from about 3,000 psi to about 7,000 psi.

4. The method according to claim 1, wherein said crumb precursor particles have an average particle size from about 20 μm to about 2000 μm.

5. The method according to claim 1, wherein said crumb precursor further includes water in the amount of less than about 6 wt %.

6. The method according to claim 1, wherein said crumb precursor further includes water in the amount of less than about 4 wt %.

7. The method according to claim 1, wherein said crumb precursor further includes water in the amount of less than about 2 wt %.

8. The method according to claim 1, wherein said crumb precursor further includes water in the amount of about 1 wt % to about 4 wt %, and said pressure is from about 2000 psi to about 5000 psi.

9. The method according to claim 1, wherein said milk powder includes milkfat from about 0.5 wt % to about 75 wt %.

10. The method according to claim 1, wherein said crumb precursor further includes other nutritive carbohydrate sweeteners, other forms of dairy ingredients, emulsifiers, and/or flavorings.

11. A crumb precursor comprising a solid block of compressed substantially crystalline sugar in an amount between 40 wt % to about 70 wt %, about 20 wt % to about 38 wt % milk powder and about 8 wt % to about 20 wt % chocolate liquor having a volume between about 25 cm$^3$ to about 5000 cm$^3$.

12. The solid block according to claim 11, wherein said block is formed in a geometric shape.

13. The solid block according to claim 12, wherein said shape is substantially rhombic.

14. The solid block according to claim 12, wherein said shape is substantially orthorhombic.

15. The solid block according to claim 12, wherein said shape is substantially cylindrical.

16. A method of transporting crumb precursor, said method comprising the steps of forming a discrete solid block by compressing a confined mass of free-flowing crumb precursor particles comprising substantially crystalline sugar, milk powder and chocolate liquor, said solid block having a volume between about 25 cm$^3$ to about 5000 cm$^3$, and conveying said solid block.

17. The method according to claim 16, wherein said discrete solid block comprising crumb precursor is formed from a multitude of crumb precursor particles and wherein the bulk density of the discrete solid block is greater than the bulk density of the multitude of crumb precursor particles.

* * * * *